United States Patent [19]

Wick

[11] 4,378,636
[45] Apr. 5, 1983

[54] CUTTING TOOL

[76] Inventor: John R. Wick, 11143 Hendrix St., Philadelphia, Pa.

[21] Appl. No.: 215,771

[22] Filed: Dec. 12, 1980

[51] Int. Cl.³ .............................................. B26B 13/00
[52] U.S. Cl. ......................................... 30/92; 30/250
[58] Field of Search ..................... 30/192, 250, 251, 92

[56] References Cited

U.S. PATENT DOCUMENTS 3,210,844 10/1965 Tontscheff ............................ 30/250
4,176,450 12/1979 Muromoto ............................ 30/92
4,312,127 1/1982 Tanaka ................................. 30/92

Primary Examiner—Jimmy C. Peters
Attorney, Agent, or Firm—Synnestvedt & Lechner

[57] ABSTRACT

A cutter suitable for severing thick communications cable comprises a cutting lever member and a holding lever member pivoted to each other between their ends to provide, at one end thereof, a pair of opposed jaws. One of the jaws is in the form of a hook-shaped holding member having a concave nesting area for receiving the cable to be cut, and the other jaw is in the form of a cutting head having a cutting edge facing the nesting area and the cable. The cutting lever member has an integral handle at its other end, while a ratchetting lever member, with handle, is pivotally mounted on the other end of the holding lever member. The rim of the cutting head opposite from its cutting edge is toothed to form a gear segment which meshes with a drive sprocket wheel rotatably mounted on the pivot which mounts the ratchetting lever member. An automatically controlled pawl acts between the ratchetting lever member and the sprocket, and when engaged permits ratchetted advance of the cutting edge through the cable by angularly reciprocating motion of the ratchetting lever member within a predetermined range. Stop means lock the ratchetting lever member to the holding lever member when it is urged beyond its ratchetting angular range, to permit rapid opening of the jaws for receiving the cable and rapid closing of the jaws into contact with the cable preparatory to cutting. The hook-shaped holding member comprises a pair of spaced-apart plates for receiving and supporting the cutting head laterally during the cutting operation.

12 Claims, 12 Drawing Figures

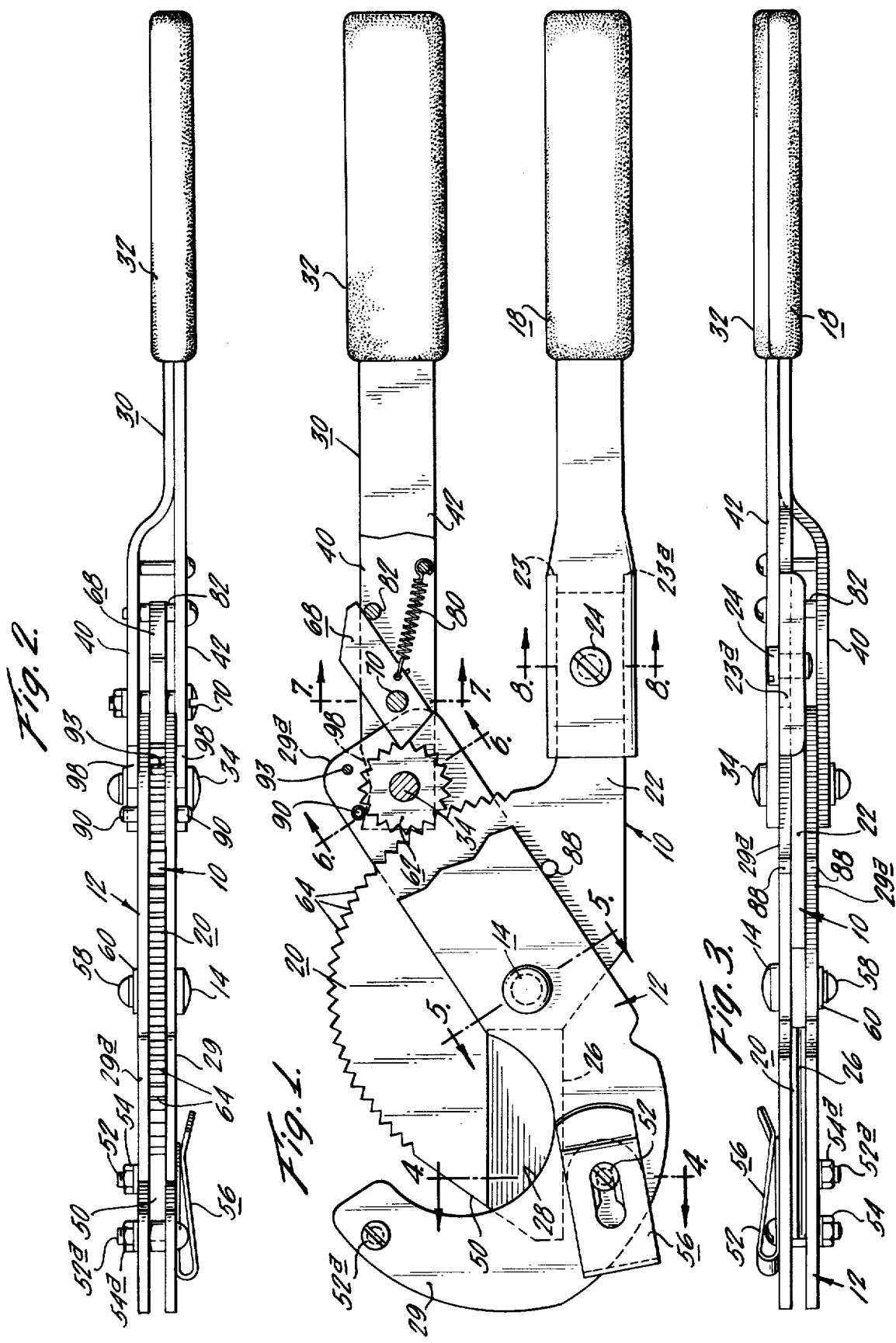

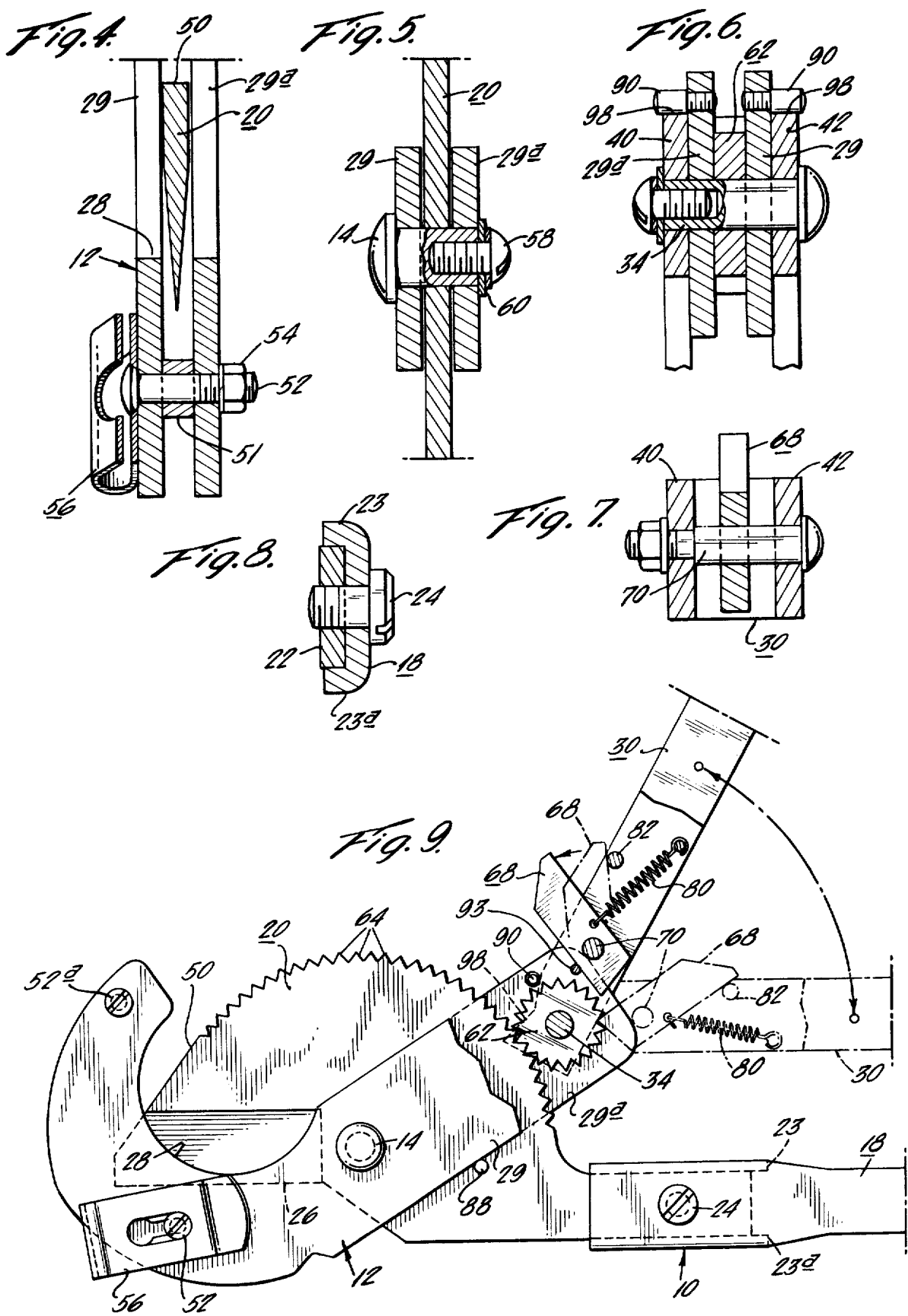

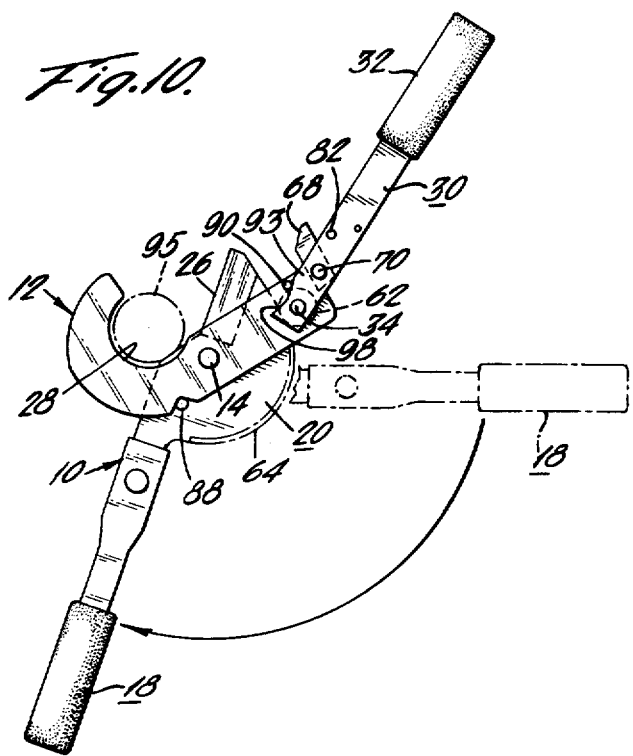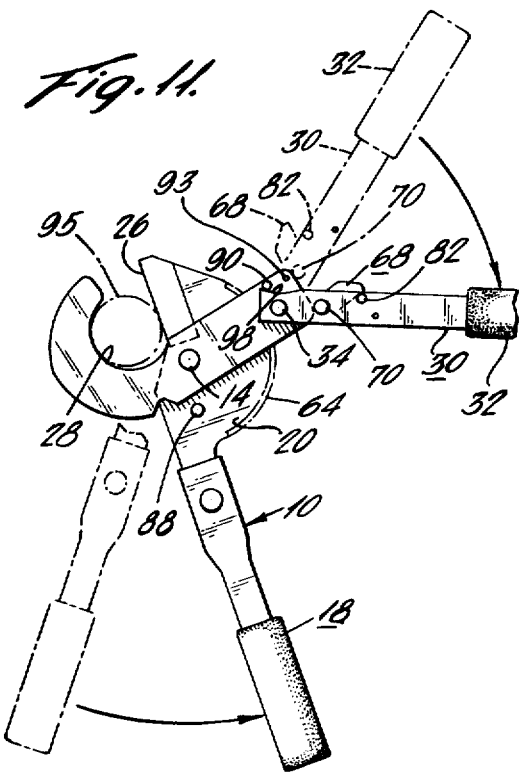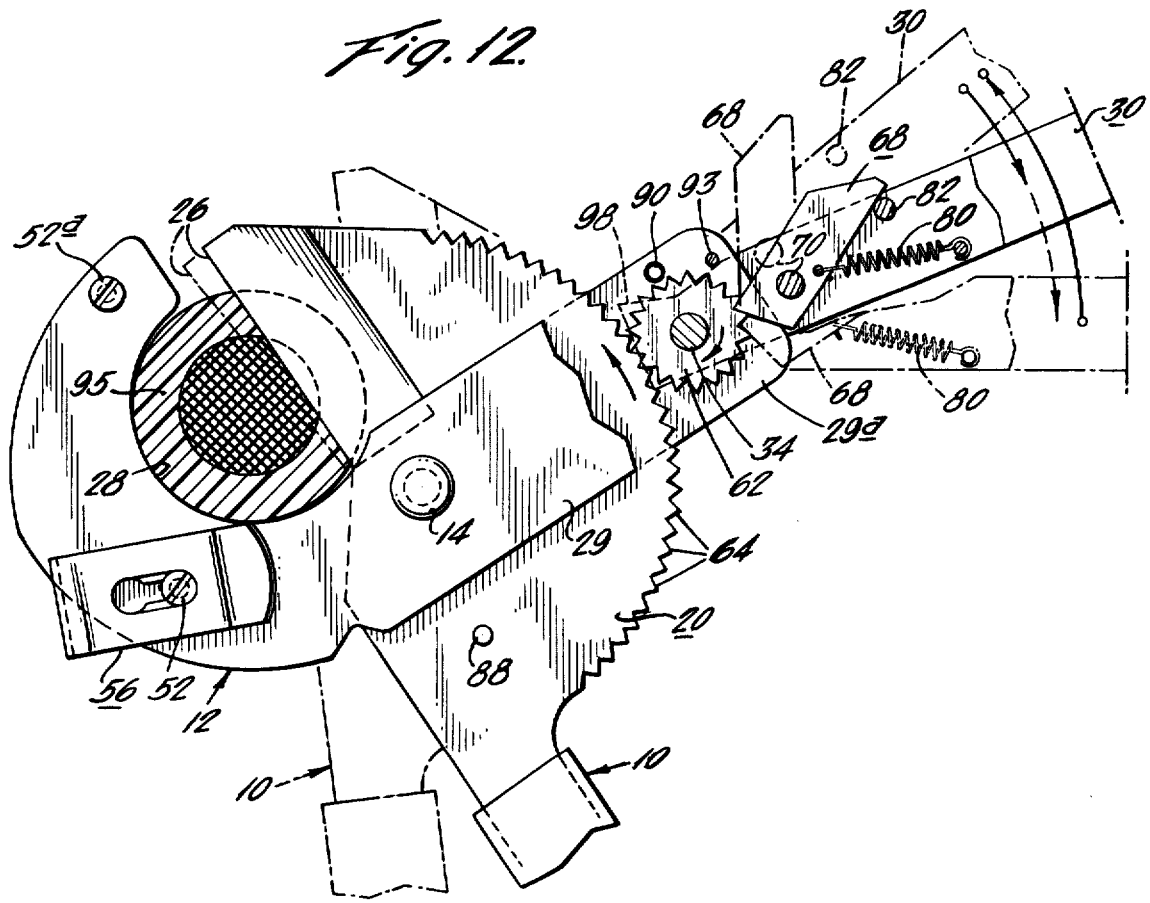

CUTTING TOOL

BACKGROUND OF THE INVENTION

This invention relates to a cutting tool suitable for severing bundles of cabled strands. It is particularly useful in cutting what is known as "communications" cable, and it will be described in that frame of reference, although it may be used in severing other objects. Communications cable comprises a bundle or group of bundles of very small diameter electrical conductors, each strand of which carries a coating of insulating material. Such cables may contain as many as several hundred filaments in a cable only a few inches in diameter. They are highly resistant to severing.

Until the present invention, there seems to have been no manually-operable commercially-available tool that was capable of cutting cables of this type without causing damage to at least some of the conductors. Saws have a tearing effect; knives and chisels smash the insulation and distort the conducting elements; shears are as destructive as chisels. Previously-known tools for doing this work are bulky and ineffective, since they are difficult to operate without repeated manual adjustment as each cut is made, and the stress imposed by the shearing action flattens the cable and strips the insulating coat.

One of the tools previously used resembles a pair of pliers in which one of the jaws is a knife and the other jaw serves as an anvil. A major objection to this type of tool is its very limited capacity to cut large-diameter cable. Unless the knife is quite thick, its edge will curl or chip instead of cutting. But the thicker the blade, the greater must be the displacement of the metal in the cable being cut, the greater the force required to make the cut, and the greater the tendency to flatten and distort the cable.

Tools having a shearing action are likely to draw the very fine strands of the cable into the zone between the blades of a shear-type tool, thus wedging the blades apart and jamming the jaws, while at the same time stripping insulation from some of the conductors. The result is a ragged cut instead of a smooth one, and the distortion of the cable at the point where it is cut makes it difficult or impossible to fit the severed ends neatly into clamps or fittings of rigid metal.

The problem presents a vicious circle: The blades in a shear-type cutter simply must be thick, not only to resist nicking and curling of their cutting edges, but also to counteract the tendency to spread apart, with resultant outward flaring, when making a cut. Yet the thickness required greatly increases the energy needed to drive them through the cable being cut, and this cannot be remedied in the usual way—namely, by lengthening the handles to add leverage, because the tool itself must often operate in very confined quarters—e.g., in a manhole, where the total clearance available may be not much more than the shoulder width of a sturdy man. There is no room for long handles. This is an unavoidable limitation, because the manhole must accommodate not only the cable sections, but also various accessories for the system as a whole.

While hydraulically or pneumatically driven cutting devices are known which can cut very thick cable, they are in general bulky and expensive, and require use of pneumatic or hydraulic lines and pumps.

SUMMARY OF THE INVENTION

The cutting tool of the invention comprises a cutting lever member and a holding lever member pivotally mounted to each other intermediate their respective ends by a main pivot and having, respectively, a blade portion and a holding portion on one side of the main pivot. The holding portion is preferably concave to receive and hold the object to be cut, such as a communications cable, and the blade portion has a cutting edge confronting the holding portion which is urged toward the holding portion and against the object to be cut when the ends of the two lever members on the opposite side of the main pivot are urged toward each other in a closing direction to accomplish cutting. Preferably the holding portion comprises blade receiving and guiding members in the form of a pair of parallel plates which are spaced apart to receive the blade portion when it is closed to the holding portion during cutting, so as to reinforce and rigidify the blade portion, thus permitting use of a thinner blade portion than would otherwise be required.

One of the above-described lever members is provided with an integral handle portion on the other side of the main pivot, while the other lever member is provided with a ratchetting lever member pivotally mounted thereon by a second pivot. Preferably, but not necessarily, the holding lever member is the one on which the ratchetting lever member is pivotally mounted, and the invention will be described with particular reference to such embodiment.

In such case, the cutting lever member is provided with a main gear having gear teeth extending coaxially with the axis of the main pivot, and a drive sprocket is pivotally mounted on said second pivot with its teeth meshing with those of the main gear segment. Controllable pawl means are provided which are engageable with the drive sprocket and which are responsive to angularly reciprocating motion angular range with respect to the holding lever member, to produce ratchetted closing motion between the blade portion and the holding portion of the other two lever members. This ratchetting action provides a desirable high mechanical advantage in forcing the cutting edge of the blade portion through the object to be cut.

In addition, means are provided which limit the angular motion of the ratchetting lever member beyond said angular range in the opening direction, for holding the ratchetting lever member in fixed angular relation to the holding lever member during such further angular opening motion with respect to the cutting lever member, thereby to effect direct and rapid opening of the cutting portion from the holding portion when a section of cable is to be placed between them for cutting. Means are also provided which limit the angular motion of the ratchetting lever member beyond said angular range in the opposite or closing direction, for holding the ratchetting lever member in fixed angular relation to the holding lever member during further angular closing motion of said ratchetting lever member thereby to permit direct and rapid closing of said cutting portion toward said holding portion when the blade edge is to be closed against the cable preparatory to cutting it.

Preferably, the pawl means comprises a pawl mounted on the ratchetting lever member and controllable to be moved between a first position in which it engages said sprocket teeth and a second position in which it is disengaged from said sprocket teeth. In said first position the pawl prevents relative rotation of the drive sprocket with respect to the ratchetting lever member in one angular sense, such that angular motion of said ratchetting lever member in the closing direction within said angular range turns said drive sprocket in the direction to close said blade portion toward said holding portion; when said ratchetting lever member has been closed to the limit of said angular range, further closing motion thereof directly drives the holding lever member in the closing direction so that the main gear teeth drive the sprocket gear teeth in the opposite angular sense of relative rotation with respect to the pawl, the pawl then sliding over the drive sprocket teeth to permit the desired rapid closing motion of the blade portion toward the holding portion. Upon subsequent opening motion of the ratchetting lever member through said angular range, the opposite angular sense of relative angular motion of the sprocket again occurs, so that the pawl slides over the drive sprocket teeth until the opposite limit of said angular range is reached. At this point, if the pawl were permitted to remain in its engaged first position, further opening motion of the ratchetting lever member would not be possible, since such motion directly drives the holding lever member in the opening direction so that the main gear turns the drive sprocket in the one sense of relative rotation with respect to the ratchetting lever member which the pawl does not permit. However, pawlcontrol means are employed which automatically move the pawl to its disengaged second position by the time the ratchetting lever reaches the limit of said angular range in its opening direction, so that the desired rapid opening of blade portion from the holding portion is provided without interference by the pawl.

In a preferred embodiment, the pawl control means comprises spring means for biasing said pawl into said engaged first position and stop means on said holding lever member for contacting said pawl and moving it to its disengaged second position in response to motion of the ratchetting lever member in the opening direction within said angular range.

The tool of the invention thus permits the user, without removing either hand from the handles, rapidly to open the jaws of the tool sufficiently widely to receive and embrace the circumference of a relatively large cable to be cut; to close the jaws rapidly and without ratchetting until the cable is held tightly between blade portion and holding portion preparatory to cutting; to continue the closing action with substantial mechanical advantage, thereby cutting the cable; and to perform a ratchetted cutting by angular reciprocation of the ratchetting lever member, if desired or necessary during the cutting phase of the operation. The blade may be relatively thin, due to its support and reinforcement by the parallel plates of the holding portion, and provides a smooth cut of the cable as desired.

BRIEF DESCRIPTION OF FIGURES

How these and other objectives and advantages of the invention are to be secured will become evident as this description proceeds, and will be understood from reference to the accompanying drawings, which illustrate a preferred embodiment of the invention, and in which:

FIG. 1 is a view in elevation, with portions broken away to show inner structure, showing the tool of the invention in a fully-closed position suitable for storing or transporting it;

FIG. 2 is a top plan view of the tool shown in FIG. 1;

FIG. 3 is a plan view of the tool shown in FIG. 1, as seen from the bottom;

FIGS. 4 through 8 are enlarged fragmentary transverse sectional views, taken on the lines 4—4, 5—5, 6—6, 7—7, and 8—8 of FIG. 1 showing in detail various of the pivot, spacer and fastener arrangements;

FIG. 9 is an elevational view, similar to FIG. 1, but with the ratchetting handle in a position to begin opening movement of the cutting jaws;

FIG. 10 is a diagrammatic view, showing the tool fully open to receive a cable to be cut;

FIG. 11 is a diagrammatic view showing the tool with its jaws closed against opposite sides of the cable preparatory to the making of a cut; and FIG. 12 is a fragmentary elevational view of the tool, showing a cable beginning to be severed and indicating, in dot-and-dash lines, alternate positions of the parts during ratchetting movement.

DETAILED DESCRIPTION OF SPECIFIC EMBODIMENTS

As seen in these figures, the tool comprises a cutting lever member 10 and a holding lever member 12 pivotally mounted to each other intermediate their ends by a main pivot 14. The cutting lever member 10 comprises a handle portion 18 and a plate-like blade portion 20. In this example the blade portion is in the form of a metal cutting head integrally mounted on handle portion 18 by a neck portion 22 thereof, which fits between flanges 23, 23a of handle portion 18 to be held by threaded fastener 24, as shown in FIG. 8. Blade portion 20 has a cutting edge 26 formed by double bevelling of the otherwise uniform thickness of the blade portion 20. (see FIG. 4).

Holding lever member 12 has a concave portion or nesting area 28 facing the cutting edge 26 of the blade portion and designed to receive and hold the object to be cut; in this case it is assumed that a thick cable of generally cylindrical configuration is to be severed, and the concave holding portion 28 is substantially semicircular in form. Holding lever member 12 is made up of two identical hook-shaped cheek plates 29, 29a, laterally aligned with each other and spaced apart to receive the blade portion 20 closely and supportively between them.

Pivotally mounted on holding lever member 12 on the opposite side of main pivot 14 from the holding portion 28 is a ratchetting lever member 30, having a handle portion 32 at its outer end; its other end is pivotally mounted to holding lever member 12 by pivot means in the form of sprocket pin 34, which also serves other functions described hereinafter. Ratchetting lever member 30 is angularly movable within a limited angular range about the axis of pivot 34, which axis is parallel to the axis of main pivot 14; the limits of this permitted range of pivotting of the ratchet lever member are defined by stop means acting between the ratchet lever member and the holding lever member, as described later. It is noted that the ratchetting lever member 30 is bifurcated at the end thereof adjacent pivot 34 to provide two spaced-apart parallel plate members 40 and 42, through both of which sprocket pin 34 passes. The ratchet plate members 40 and 42 are spaced sufficiently far apart to receive between them the cheek plates 29 and 29a, which in turn are spaced sufficiently far apart to receive and provide a close guiding and supporting function for the blade portion 20 of cutting lever member 10. More particularly, the radially outward portion 50 of blade portion 20 is provided with a material thickness such as to fit closely between the cheek plates 29 and 29a thus providing the guiding and reinforcing action at least during the latter portion of the cutting operation.

FIG. 4 illustrates how the outer portion 50 of blade portion 20 is sheathed between the cheek plates 29 and 29a in close guiding and supporting relation thereto, to provide the desired reinforcement and stiffening of the blade portion. Also shown in FIG. 4 is a spacer 51 positioned between the cheek plates, and a bolt 52 and nut 54 which extend through the cheek plates and the spacer 51 to clamp the cheek plates in the desired spaced-apart relation. A suitable carrier clip 56 is also held under the head of bolt 52 to permit convenient carrying of the entire tool by clipping it to the belt of the user, and also permitting it to be hoisted by a suitable cord to any desired working location. A similar bolt 52a, nut 54a and spacer 51a are provided near the tip of the hooked blade portion to assist in maintaining the desired spacing between the cheek plates 29 and 29a.

FIG. 5 shows how the blade portion 20 and the cheek plates 29 and 29a may be mounted on main pivot 14 by the use of a screw 58, threaded into the shank end of the headed pivot 14, together with an appropriate washer 60 under the head of screw 58.

There will now be described apparatus in accordance with the invention by means of which the blade portion 20 may be opened from the concave holding portion 28 by a separating motion of handle portions 18 and 32 with respect to each other when it is desired to receive a cable or other object to be cut in the concave holding portion 28, and by means of which the blade portion 20 and cutting edge 26 may then be advanced toward the holding portion 28 to accomplish cutting of the cable or other object by closing motion of handle portions 18 and 32 toward each other.

A drive sprocket means in the form of a sprocket wheel 62 is rotatably and coaxially mounted on sprocket pin 34 so that the teeth of the sprocket wheel mesh with the teeth of main gear means 64, which is integral with the blade portion 20 of the cutting lever member 10; the teeth of gear means 64 form a gear segment extending along a circular path coaxial with main pivot 14, and in this example are formed in the outer peripheral edge or rim of blade portion 20. The sprocket wheel teeth are engageable by a controllable pawl means comprising a pawl 68 which is controllable to engage with, or disengage from, the sprocket teeth as a function of the angular position of ratchetting lever member 30 with respect to holding lever member 12.

More particularly, in this example the pawl 68 is pivotally mounted on ratchetting lever member 30 by means of pawl pivot 70, to provide pivotting of the pawl 68 about an axis parallel to that of the sprocket pin 34. Pawl 68 is angularly biased toward its engaged position by a pawl tension spring 80, and a pawl stop pin 82 is provided on ratchetting lever member 30 to arrest clockwise motion of the pawl in the tooth-engaging position shown in FIG. 1. When pawl 68 is in its tooth-engaging position, its orientation and shape prevent the drive sprocket wheel 62 from rotating in one angular sense with respect to the ratchetting lever member 30, namely in the counterclockwise direction in FIG. 1; however, pawl 68 in its engaged position permits sprocket wheel 62 to turn in the opposite sense relative to ratchetting lever member 30, namely the clockwise direction as viewed in FIG. 1, the pawl then merely sliding over the successive teeth of the sprocket wheel.

Accordingly, within a predetermined range of angular motion of ratchetting lever member 30 about sprocket pin 34 in the closing or clockwise direction as viewed in FIG. 1, sprocket wheel 62 is locked to ratchetting lever member 30 during such turning and will therefore itself rotate in the clockwise direction and thereby, through its engagement with the teeth of gear segment 64, drive the blade portion 20 of the cutting lever member 10 in the counterclockwise direction, i.e. the closing direction which effects cutting. Also, since pawl 68 does not prevent rotation of the ratchetting lever member 30 in the counterclockwise direction with respect to sprocket wheel 62, the ratchetting lever member 30 may be moved in angular reciprocation, driving the blade portion 20 further toward its closed position with each closing stroke of the ratchetting lever member.

As shown in FIG. 1, the tool is in its maximally closed position, defined by a stop member 88 mounted on blade portion 20 and acting against an edge of the holding lever member 12 to arrest further motion in the closing direction. To open the tool for receiving a cable to be cut, the handles 32 and 18 are moved apart, whereupon, over a predetermined angular range of motion, pawl 68 slides over the teeth of sprocket wheel 62 in the counterclockwise direction, which it can do since this corresponds to the permitted clockwise direction of relative motion of the sprocket wheel with respect to the ratchetting lever member 30. This opening motion of the handles continues without corresponding opening motion of the blade portion 20 from the holding portion 28, until the upper surface of ratchetting lever member 30 has pivotted into engagement with stop member 90 on holding lever member 12, a position which is shown in solid line in FIG. 9. The stop member 90 prevents ratchetting lever member 30 from turning further in the opening direction with respect to holding lever member 12, and in effect locks the latter two members together for further outward angular motion of the ratchetting lever member. Such further outward angular motion therefore tends to open the blade portion 20 from the holding portion 12 directly and rapidly.

However, if at this point pawl 68 were still in its engaged position as shown in FIG. 1, such further opening motion of ratchetting lever member 30 would not be possible, since it would require a counterclockwise rotation of the sprocket wheel 62 with respect to the ratchetting lever member 30, a direction of rotation which pawl 68 does not permit. Accordingly, means are provided for automatically moving pawl 68 out of engagement with the teeth of sprocket wheel 62 prior to the limiting of the opening motion of ratchetting lever member 30 by stop 90.

The pawl release means in this example comprises the pawl release pin 93 on holding lever member 12, extending between the parallel cheek plates 29 and 29a of the holding lever member. Pawl 68 is also mounted between the cheek plates 29 and 29a, and in fact between the plates 40 and 42 of the bifurcated portion of the ratchetting lever member 30, in a position such that, as shown particularly clearly in FIG. 9, pawl release pin 93 contacts pawl 68 on the opposite side of pawl pivot 70 from the point at which the pawl-restraining spring 80 is secured, thereby causing pawl 68 to rotate in the counterclockwise direction as viewed in FIGS. 1 and 9, out of engagement with the teeth of sprocket wheel 62, just prior to the point at which the ratchetting lever member 30 strikes against stop 90. With the pawl 68 thus moved to its disengaged position, continued outward angular motion of the ratchetting lever member 30 is able to act directly on holding lever member 12 and rotate it rapidly in its opening direction, for example to the wide-open position shown in full line in FIG. 10 and determined by stop 88. As also shown in FIG. 10, at this point of full opening the cable 95 may be inserted in the concave nesting portion of the holding lever member 12, where it is held during the cutting operation.

FIG. 11 shows the tool in a position in which the ratchetting lever member 30 has been moved in the closing direction sufficiently for the cable to be clamped between the cutting edge 26 and the holding portion 28, and cutting action is about to begin. In the course of this closing motion of the ratchetting handle 32, the initial closing motion permits the pawl 68 to pivot to its tooth-engaging position under the influence of spring 80. Further closing motion of the ratchetting handle drives sprocket wheel 62 in the direction to close the tool jaws somewhat, and if the original spacing between cable and jaws were small enough, clamping of the cable between the jaws could be effected during this motion; in such event, cutting could then be initiated and brought to completion by pumping the ratchet handle back and forth between its stops. However, this is generally not the case, especially in the preferred embodiment using the hook-shaped holding lever member; as can readily be seen from FIG. 11, in order for the jaws to be initially moved transversely into position about the cable, they must be opened far enough to permit passage of the cable between the outer tips of the opposed jaws, which means that when the cable is thereafter seated in the concave nesting area of the holding lever member it will be substantially spaced from the cutting edge. Accordingly, the jaws cannot in general be closed to the cable-clamping position of FIG. 11 merely by a single stroke of the ratchetting handle 32 within its ratchetting angular range. Instead, a plurality of such ratchetting strokes would be required merely to reach the cable-clamping position. In this connection it will be noted that rotation of the ratchetting lever member can only effect a partial revolution of the sprocket wheel and a correspondingly relatively small amount of closing of the blade portion to the holding portion.

Accordingly, means are also provided for limiting the closing or clockwise angular motion of the ratchetting lever member 30 with respect to the holding lever member 12, so that during further closing motion of the ratchetting lever member it is, in effect, angularly locked with respect to the holding lever member and directly drives it further in the closing direction. During such motion, the teeth on the gear segment 64 of the cutting lever member drive the sprocket wheel 62 in the clockwise direction, a direction which is permitted by pawl 68, which merely slides over the teeth during such motion.

In this example, the limiting of the closing motion of the ratchetting lever member with respect to the holding lever member is again provided by the cooperation of the stop 90 with a portion of the upper surface of the ratchetting lever member. Such position is shown for example in FIG. 1. To enable use of the same stop member 90 to limit both the opening and closing motion of the ratchetting lever with respect to the holding lever member, the latter member is provided with the obtuse notch 98 positioned so that one side of the notch strikes the stop member in the maximum closed position of the ratchetting lever member with respect to the holding lever member, and the opposite side of the notch strikes the same stop member in the maximum open position of the ratchetting lever member. Any of a number of other stop arrangements may be used instead for this purpose.

With the apparatus described, instead of requiring repeated ratchetting motion to achieve clamping, one need merely urge the ratchetting handle in one continuous closing stroke through the ratchetting angular range and against the stop 90 to close the jaws onto the cable; because the latter part of this closing stroke is effected by direct drive of the holding lever member by way of stop 90, and therefore without the mechanical advantage of the sprocket wheel and gear segment arrangement, when the clamped condition is encountered a sudden high resistance to closing motion of the handles will be experienced by the user, and he will then know to proceed with the cutting by retracting the ratchet handle into the ratchetting angular range and pumping the handles within this range until cutting is completed.

FIG. 12 illustrates such ratchetting operation during cutting, the ratchetting lever member and pawl 68 being angularly reciprocated between the upper and lower broken-line positions shown to advance the sprocket wheel one tooth at a time in this example, although it may be driven several teeth at a time by moving the ratchetting handle further on its upward stroke. The full line representation shows the ratchetting handle in an intermediate position in which the pawl has engaged the sprocket wheel to force it in the closing direction in response to the downward stroke of the ratchetting handle.

It is noted that for small cables or other objects it may be possible to accomplish complete severing without using the ratchetting lever member in an angularly reciprocatory manner to produce actual ratchetting advance of the cutting edge. However, if cutting is effected by urging the ratchetting lever member against the limiting stop in the closing direction, the cutting action will have only the mechanical advantage provided by the ratio of the distance between the main pivot and the two handle portions to the distance between the main pivot and the object being cut; to obtain the maximum mechanical advantage of the arrangement, it is highly preferable to back off the ratchetting lever member in its opening direction until the pawl has passed over one or more teeth of the sprocket wheel and then urge the ratchetting lever member in the closing direction, so that the mechanical advantage due to the ratio of the radius of the main gear segment to the radius of the sprocket wheel is also realized. Where the thickness of the object being cut is relatively large, one such backing off and reclosing of the ratchetting lever to its maximum closed position will not result in moving the cutting edge entirely through the object, in which case repeated reciprocatory angular motion of the ratchetting lever member will enable the desired continuing, but intermittent, advance of the cutting edge through the object until it is completely severed.

In operation then, the tool may be maintained in its fully closed position as shown in FIG. 1 for storage and transportation purposes. To open it for receiving a cable to be cut, the ratchetting lever member is swung in its opening direction through a predetermined angular arc during which no opening motion of the tool jaws occurs, the pawl merely sliding over the teeth of the sprocket wheel during such motion; by the time the ratchetting lever member has reached its outward extreme angular position with respect to the holding lever member, as defined by the position of stop 90, the pawl 68 will have been forced out of engagement with the sprocket wheel by stop 93 as is illustrated in FIG. 9, for example. Continued opening motion of the ratchetting lever member will directly drive the holding lever member so as to open the jaws of the tool rapidly to the wide-open position for receiving the object to be cut, as illustrated in FIG. 10; after this, the ratchetting lever member is rotated clockwise again toward its closed position, whereupon the pawl again engages the sprocket teeth to drive the jaws toward their closed position. Assuming that the jaws have been opened wider than necessary to accommodate the object to be cut, the ratchetting lever member is rotated further in its closing direction until it reaches its opposite extreme of motion with respect to the holding lever member as also defined by the position of stop 90, and the closing motion is continued further to drive the jaws together until they clamp the object to be cut. After this, the ratchetting lever member is angularly reciprocated within the angular range of its permitted motion with respect to the holding lever members, to advance the cutting edge of the blade portion through the cable in intermittent steps, but with high mechanical advantage, until complete severing has been accomplished.

In a typical embodiment, the cutter of the invention may be 18 inches or even less in overall length yet still be effective to cut communications cable 2-½ inches in diameter when manually operated as described above.

While the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

I claim:

1. A tool suitable for severing thick multistrand communications cable or the like, comprising:
   a cutting lever member, a holding lever member, and first pivot means pivotally mounting said cutting lever member and said holding lever member to each other for rotation about a first pivot axis intermediate their respective opposite ends;
   said cutting lever member comprising a blade portion on one side of said pivot axis having a cutting edge facing said holding lever member;
   said holding lever member comprising a concave holding portion on said one side of said pivot axis and facing said cutting edge to provide an opening between said cutting edge and said holding portion for receiving an object to be severed by movement toward each other of said cutting edge and said holding portion;
   a ratchetting lever member, and second pivot means pivotally mounting said ratchetting lever member to one of said cutting lever member and said holding lever member on the opposite side of said first pivot means, said ratchetting lever member having a ratchetting handle portion extending radially outward with respect to the pivot axis of said second pivot means;
   the other of said cutting lever member and said holding lever member comprising an integral main gear having main gear teeth thereon extending coaxially with said axis of said first pivot means, and having a handle portion extending radially outward with respect to said first pivot axis;
   drive sprocket means mounted for rotation about said second pivot axis and having sprocket teeth meshing with said main gear teeth;
   pawl means engageable with said drive sprocket means and responsive to angularly reciprocating motion of said ratchetting lever member, within a predetermined angular range with respect to said one lever member, for providing ratchetted closing motion between said blade portion and said holding portion;
   means limiting angular motion of said ratchetting lever member beyond said angular range in one direction for holding said ratchetting lever member in fixed angular relation to said one lever member during further angular motion of said ratchetting lever member in said one direction, with respect to the other of said cutting lever member and said holding lever member, to effect rapid opening of said cutting portion from said holding portion; and
   means limiting angular motion of said ratchetting lever member beyond said angular range in the opposite direction for holding said ratchetting lever member in fixed angular relation to said one lever member during further angular motion of said ratchetting lever member in said opposite direction, with respect to the other of said lever member and said holding lever member, to effect rapid closing of said cutting portion toward said holding portion.

2. The tool of claim 1, wherein said pawl means comprises a pawl mounted on said ratchetting lever member and controllable to be moved between a first position in which it engages said sprocket teeth and a second position in which it is disengaged from said sprocket teeth, said pawl in said first position engaging said sprocket teeth so as to prevent relative rotation of said drive sprocket means with respect to said ratchetting lever member in one angular sense thereby to provide said closing motion in response to closing motion of said ratchetting lever member within said angular range but permitting said pawl to slide over said sprocket teeth in response to the opposite sense of relative rotation of said drive sprocket means with respect to said ratchetting lever member thereby to permit said rapid closing in response to said further angular motion of said ratchetting lever member in said opposite direction, and also permitting said pawl to slide freely over said sprocket teeth in response to angular rotation of said ratchetting lever member in said one direction within said angular range; and
   pawl control means for disengaging said pawl from said sprocket teeth during said further angular motion of said ratchetting lever member in said one direction.

3. The tool of claim 2, wherein said pawl control means comprises spring means for biasing said pawl into said engaged first position, and stop means on said one lever member for moving said pawl to said disengaged second position in response to angular motion of said ratchetting lever member in said one direction beyond a predetermined point within said angular range.

4. The tool of claim 1, wherein said holding portion of said holding lever member comprises a pair of parallel plates spaced apart to receive said blade portion therebetween in closely-fitting guiding relationship upon closing of said blade portion toward said holding portion.

5. The tool of claim 1, wherein said one lever member on which said ratchetting lever member is pivotally mounted is said holding lever member.

6. Apparatus suitable for the cutting of thick multi-strand cable, comprising:
   a cutting lever member, a holding lever member, and first pivot means pivotally mounting said cutting lever member and said holding lever member to each other for rotation about a first pivot axis intermediate their respective opposite ends;
   said cutting lever member comprising a handle portion on one side of said first pivot axis and a blade portion on the other side of said first pivot axis having a cutting edge facing said holding lever member;
   said holding lever member comprising a concave portion on said other side of said first pivot axis and facing said cutting edge to form an opening between said cutting edge and said concave portion for receiving and holding cable to be cut by movement toward each other of said concave portion and said cutting edge;
   a ratchetting lever member, and second pivot means having an axis parallel to the axis of said first pivot means for pivotally mounting said ratchetting lever member to said holding lever member on said one side of said first pivot means, said ratchetting lever member having a handle portion extending outward from said first pivot means;
   said cutting lever member comprising a main gear integral therewith and having main gear teeth thereon extending between said first and second pivot means coaxially with the axis of said first pivot means;
   circular drive sprocket means mounted on said holding lever member for rotation about said second pivot axis and having peripheral sprocket teeth meshing with said main gear teeth, said sprocket teeth extending along a circle of lesser radius than said main gear teeth; said sprocket means, when free, rotating about said second pivot axis and travelling along said main gear as said holding lever member is rotated in either direction about said first pivot axis;
   first stop means preventing said ratchetting lever member from pivotting in the opening direction beyond a first predetermined angular position with respect to said holding lever member;
   second stop means preventing said ratchetting lever member from pivotting in the closing direction beyond a second predetermined angular position with respect to said holding member;
   pawl means, and third pivot means pivotally mounting said pawl means on said ratchetting lever adjacent said sprocket gear means;
   pawl-control means for controlling the position of said pawl means as a function of the angle of said ratchetting lever member with respect to said holding lever member, so that when said handle portions are moved apart in the opening direction said concave portion and said blade portion are opened from each other to receive a cable to be cut, and when said handle portions are moved together in the closing direction said blade portion and said concave portion are moved in the closing direction to accomplish cutting of said cable;
   said pawl control means comprising
   spring-means for biasing said pawl means angularly toward engagement with said drive sprocket means;
   third stop means on said holding lever member for contacting said pawl means to hold it in an angular position in which it is free of said drive sprocket means when said ratchetting lever member is at said first predetermined angular position;
   said third angular stop means permitting said spring-biased pawl means to fixedly engage said drive sprocket means when said ratchetting lever member is moved from said first predetermined angular position toward said second predetermined angular position, thereby to rotate said drive sprocket means and drive said main gear in the direction to close said blade portion toward said concave portion;
   said pawl means being free to ride over said sprocket gear teeth when said ratchetting lever arm is rotating in the opening direction with respect to said holding lever member between said first and second predetermined angular positions, thereby to permit ratchetted closure of said blade portion toward said concave portion in response to angular reciprocatory motion of said ratchetting lever member in the angular range between said first and second angular positions.

7. The apparatus of claim 6, wherein said concave portion of said holding lever member comprises a pair of parallel plates spaced apart to receive guidingly said blade portion of said holding lever member as said blade portion is closed to said holding portion during said cutting.

8. A cutting tool, comprising:
   a pair of lever members pivoted to each other at a point intermediate their respective ends and having at one of their ends a pair of jaws for effecting cutting of an object placed between said jaws;
   a drive sprocket rotatably mounted on one of said pair of lever members on the opposite side of said intermediate point from said jaws;
   a toothed gear segment on the other of said lever members and meshing with said drive sprocket;
   a further lever member pivoted to said one lever member for turning said drive sprocket to drive said gear segment in the direction which closes said jaws, in response to angular motion of said further lever member within a predetermined angular range with respect to said one lever member; and
   means for locking said further lever member to said one lever member during angular motion thereof outwardly of either extreme of said angular range, to enable direct opening motion and direct closing motion of said jaws by said further lever member independently of said drive sprocket and gear segment.

9. A cable-cutting tool, comprising:
   a cutting lever member having a handle at one end and a cutting head integrally secured to its opposite end, said cutting head having a cutting edge on one side thereof;
   a holding lever member and main pivot means mounting said cutting head to said holding lever member for pivoting about an axis intermediate their respective ends;

said holding lever member having a hook-shaped holding portion comprising a pair of similar parallel laterally-aligned cheek plates mounted in spaced-apart relation to each other, said cheek plates having a concave portion confronting said cutting edge for holding the cable to be cut and being spaced-apart by a distance such as to receive said cutting head closely and supportively between them when said cutting head is closed to said holding portion for effecting said cutting;

said cutting head having a parti-circular edge opposite said cutting edge, with teeth formed in its periphery to form a main gear segment coaxial with said main pivot means;

a drive sprocket wheel, and a sprocket pin rotatably mounting said drive sprocket wheel on said holding lever member in a position such that its teeth mesh with those of said main gear segment;

a ratchet lever member pivotally mounted on said sprocket pin and having a handle portion extending radially outward from said sprocket pin;

a pawl and a pawl pivot mounting said pawl on said ratchet lever member for pivoting about an axis parallel to that of said sprocket wheel;

a pawl tension spring biasing said pawl about said pawl pivot axis into engagement with said sprocket wheel when said ratchetted lever member is in a predetermined angular range with respect to said holding lever member;

a pawl release pin on said holding lever member positioned to contact said pawl, and pivot it out of engagement with said sprocket wheel, when said handle portion of said ratchet lever member is pivoted in one angular sense to a first extreme portion of said angular range with respect to said holding lever member, while permitting said pawl to engage said sprocket wheel when said ratchet lever member is positioned within said angular range but outside said extreme portion thereof;

said pawl when engaged with said sprocket wheel preventing it from rotating relative to said ratchet lever member in the direction corresponding to the opening direction of rotation of said main gear segment on said cutting head, but permitting said sprocket wheel to rotate in the opposite relative direction, whereby rotation of said ratchet handle portion within said angular range, in the closing direction toward said handle of said cutting lever member, rotates said sprocket wheel in the direction to close said cutting head toward said holding portion of said holding lever member; and ratchet stop means acting between said ratchet lever member and said holding lever member for arresting angular motion of said ratchet lever member beyond said angular range in either angular sense with respect to said holding lever member, whereby urging of said ratchet lever member against said stop means in the direction corresponding to closing of said holding portion and cutting head accomplishes the closing thereof directly and independently of said sprocket wheel and main gear segment, said pawl then permitting free rotation of said sprocket wheel, relative to said pawl, in the direction to close said holding portion and cutting head, and urging of said ratchet lever member in said one angular sense against said stop means in the direction corresponding to the opening of said holding portion and cutting head accomplishes opening thereof directly and independently of said sprocket wheel and main gear segment.

10. The tool of claim 9, comprising additional stop means acting between said cutting head and said holding lever member for arresting further closing motion of said cutting head after it has passed through the position thereof in which said cable is completely severed.

11. The tool of claim 9, comprising pawl stop means limiting the angular rotation of said pawl in response to said pawl tension spring.

12. The tool of claim 9, wherein said ratchet lever member comprises a pair of spaced-apart ratchet-lever plates; a portion of said cheek plates, said drive sprocket wheel, said pawl and said pawl tension spring being located between said pair of ratchet-lever plates; and said sprocket pin, said pawl pivot, said pawl stop means and said pawl release pin being located between said ratchet-lever plates.

* * * * *